United States Patent [19]
LaBerge

[11] Patent Number: 5,771,358
[45] Date of Patent: Jun. 23, 1998

[54] METHOD AND SYSTEM FOR APPORTIONING COMPUTER BUS BANDWIDTH

[75] Inventor: Paul A. LaBerge, Shoreview, Minn.

[73] Assignee: Micron Electronics, Inc., Nampa, Id.

[21] Appl. No.: 680,446

[22] Filed: Jul. 15, 1996

[51] Int. Cl.$^6$ .................................................. G06F 13/14
[52] U.S. Cl. ............................................................ 395/287
[58] Field of Search .................................... 395/297, 304, 395/287, 296

[56] References Cited

U.S. PATENT DOCUMENTS

| | | | |
|---|---|---|---|
| 5,241,632 | 8/1993 | O'Connell et al. .................... | 395/297 |
| 5,426,740 | 6/1995 | Bennett .................................. | 395/306 |
| 5,506,969 | 4/1996 | Wall et al. ............................. | 395/287 |

OTHER PUBLICATIONS

M. Morris Mano, Computer System Architecture (Second Edition), Prentice–Hall, Inc. 1982 pp. 406–415 and pp. 454–462.

Primary Examiner—Glenn A. Auve
Attorney, Agent, or Firm—Seed and Berry LLP

[57] ABSTRACT

A method interfaces a plurality of bus requesters with a computer bus. The method apportions the bus bandwidth among the bus requesters by assigning to each bus requester a bus bandwidth portion that is based on the bandwidth of the bus requester. The method identifies a requester bandwidth for each of the bus requesters and sums the requester bandwidths to obtain a total bandwidth. The method determines, for each of the bus requesters, a weighting value representing the ratio of the bus requester bandwidth to the total bandwidth. The method apportions the bus bandwidth among the bus requesters by assigning each bus requester a bus bandwidth portion that reflects the weighting value of the bus requester. Apportioning the bus bandwidth based on the weighting values causes the requester bandwidth of each bus requester to be reduced by the same percentage when the bus saturates.

23 Claims, 3 Drawing Sheets

METHOD AND SYSTEM FOR APPORTIONING COMPUTER BUS BANDWIDTH

TECHNICAL FIELD

The present invention relates to computer bus control, and more particularly, to apportioning computer bus bandwidth among a plurality of bus requesters.

BACKGROUND OF THE INVENTION

A computer system includes a set of interconnected components or modules of three basic types: central processing unit (CPU), memory, and input/output (I/O). The modules of the computer system are connected together by communication pathways known as busses. A bus is a shared transmission medium in that plural computer modules can transmit across the same bus. However, if two modules transmit during the same time period, their signals will overlap and become garbled. Therefore, it is important to ensure that only one module transmits across the bus during a given time period.

The process of allocating time or bandwidth on a computer bus among plural bus requesters is known as arbitration. Typically, an arbiter grants access for a predetermined time period or bandwidth window to whichever bus requester first requests use of the bus. If plural bus requesters have requests for use of the bus pending, then the arbiter typically employs a rotational priority scheme to share the bus among the bus requesters. In a rotational priority scheme, the use of the bus is given for one bandwidth window to each bus requester in sequential order. Thus, the rotational priority scheme gives each bus requester the same amount of bus time as every other bus requester connected to the bus.

Although the rotational priority scheme might seem to be an optimal allocation of the bus, it has drawbacks. In particular, each bus requester is given the same amount of time to use the bus regardless of the processing speeds of the bus requesters. When the bus saturates, the highest bandwidth bus requester will be slowed down before the lower bandwidth bus requesters are affected. For example, assume the bus is running at 300 megabytes per second (MB/s), requesters A and B are each running at 100 MB/s, and requester C is running at 200 MB/s. The bus is saturated because the total bandwidth of the requesters (400 MB/s) is greater than the bandwidth of the bus (300 MB/s). Under the rotational priority scheme, requesters A and B each will continue to run at 100 megabytes per second while the high bandwidth requester C will be slowed to 100 megabytes per second. Thus, upon bus saturation the rotational priority scheme allocates the available bus bandwidth by slowing down higher bandwidth bus requesters before slowing down lower bandwidth bus requesters. Moreover, even if the bus is so saturated that the lower bandwidth bus requesters need to be slowed down, the lower bandwidth requesters are not slowed down as much as the higher bandwidth requesters.

SUMMARY OF THE INVENTION

The invention is directed to a method and system for interfacing a plurality of bus requesters with a computer bus having a bus bandwidth. The invention apportions the bus bandwidth among the plurality of bus requesters by assigning to each bus requester a bus bandwidth portion that is based on the bandwidth of the bus requester. The invention operates by identifying a requester bandwidth for each of the plurality of bus requesters and sums the requester bandwidths to obtain a total bandwidth for the plurality of bus requesters. The invention determines, for each of the bus requesters, a weighting value representative of the ratio of the bus requester bandwidth to the total bandwidth. The invention apportions the bus bandwidth among the bus requesters based on the weighting values of the bus requesters such that each bus requester receives a bus bandwidth portion that reflects the weighting value of the bus requester. Apportioning the bus bandwidth based on the weighting values causes the requester bandwidth of each bus requester to be reduced by the same percentage when the bus saturates.

The invention can apportion the bus bandwidth either statically or dynamically. In the static embodiment, the invention identifies the requester bandwidth for each requester by querying the requester for its type and looking up the requester type in a lookup table that stores rated maximum bandwidths for various requester types. The static embodiment apportions the bus bandwidth by assigning to each requester the same percentage of its rated maximum bandwidth as every other bus requester using the bus. In the dynamic embodiment, the invention monitors how much each bus requester uses the bus and identifies the requester bandwidth based on how much the requester uses the bus. The dynamic embodiment assigns more bus bandwidth to the bus requesters that have recently used a high amount of bandwidth and assigns less bus bandwidth to those bus requesters that have not used the bus as much.

DETAILED DESCRIPTION OF THE INVENTION

Figure 1:
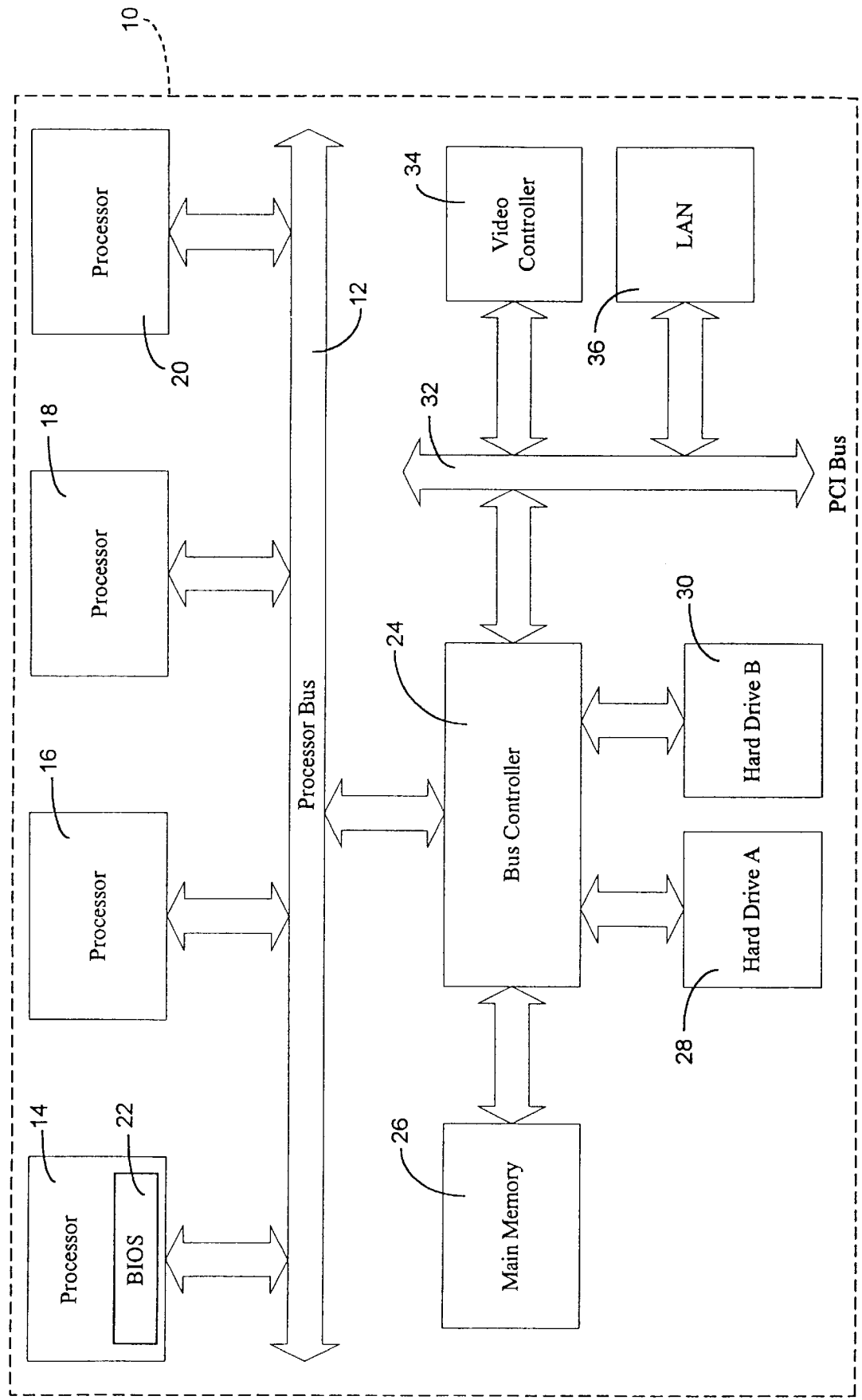
FIG. 1 is a block diagram of a computer system according to the present invention.

Shown in FIG. 1 is a computer system 10 that apportions the available bus bandwidth on a processor bus 12. The computer system 10 includes a multiprocessor system architecture in which first through fourth computer processors 14, 16, 18, 20 are each coupled to the processor bus 12. Each of the processors 14, 16, 18, 20 can be any of numerous known computer processors, such as the Intel P6 processor. It will be appreciated that the invention also is applicable to computer systems employing more or fewer processors. At least one of the processors, such as the first processor 14, includes a basic input/output system (BIOS) 22 that controls how information is transmitted between elements or modules of the computer system. The BIOS 22 is a set of software routines that are typically stored in read-only memory (ROM) of the processor 14. The BIOS 22 is executed by the processor shortly after turning on the computer system 10 in order to initialize the connections between the computer system modules.

The computer system 10 also includes a bus controller 24 that controls access to the processor bus 12 by a plurality of bus requesters 26, 28, 30, 32. Each bus requester is a computer system element that requests use of the processor bus 12. As shown in FIG. 1, the bus requesters include a main memory 26, a hard drive A 28, a hard drive B 30 and a Peripheral Component Interconnect (PCI) bus 32. Further, the computer processors 14–20 also are bus requesters. The PCI bus 32 is shared by two subrequesters: a video controller 34 and a local area network (LAN) 36. It will be appreciated that the particular modules shown as bus requesters 26–32 and subrequesters 34–36 are exemplary only and numerous other types and numbers of bus requesters could be employed without departing from the invention. In addition, the invention is equally applicable to apportion the processor bus 12, the PCI bus 32, or any other computer system bus.

The bus controller 24 controls access to the processor bus 12 by assigning each of the bus requesters 26–32 a time period or bandwidth window during which the bus requester can transmit data across the processor bus 12. In contrast to prior art computer systems, the bus controller 24 apportions the bus bandwidth of the processor bus 12 based on requester bandwidths of the bus requesters 26–32. For example, assume that the bandwidth of the processor bus is 400 MB/s and the bandwidths of the main memory 26, hard drive A 28, hard drive B 30, and PCI bus 32 are 100 MB/s, 100 MB/s, 100 MB/s, and 200 MB/s, respectively. As such, the total requester bandwidth is 500 MB/s (3×100+200). Since the bus bandwidth is 400 MB/s, the requester bus 12 has become saturated. Under the prior art rotational priority scheme, the requester bandwidth of the PCI bus 32 would simply be reduced to 100 MB/s and the requester bandwidths of the main memory 26, hard drive A 28, and hard drive B 30 would remain at 100 MB/s. In contrast, the bus controller 24 of the present invention reduces each of the requester bandwidths of the bus requesters by the same percentage. Preferably, the equal percentage bus allocation is accomplished by calculating a weighting value for each bus requester based on the ratio between the requester bandwidth and the total requester bandwidth. Given that the total requester bandwidth is 500 MB/s, each of the main memory 26, hard drive A 28, and hard drive B 30 is given $\frac{1}{5}$ ($\frac{100}{500}$) of the processor bus bandwidth and the PCI bus 32 is given $\frac{2}{5}$ ($\frac{200}{500}$) of the processor bus bandwidth. As a result, each of the main memory 26, hard drive A 28, and hard drive B 30 is given 80 MB/s, the PCI bus 32 is given 160 MB/s. Thus, each bus requester 2632 is given 80% of its requester bandwidth.

Figures 2, 3:
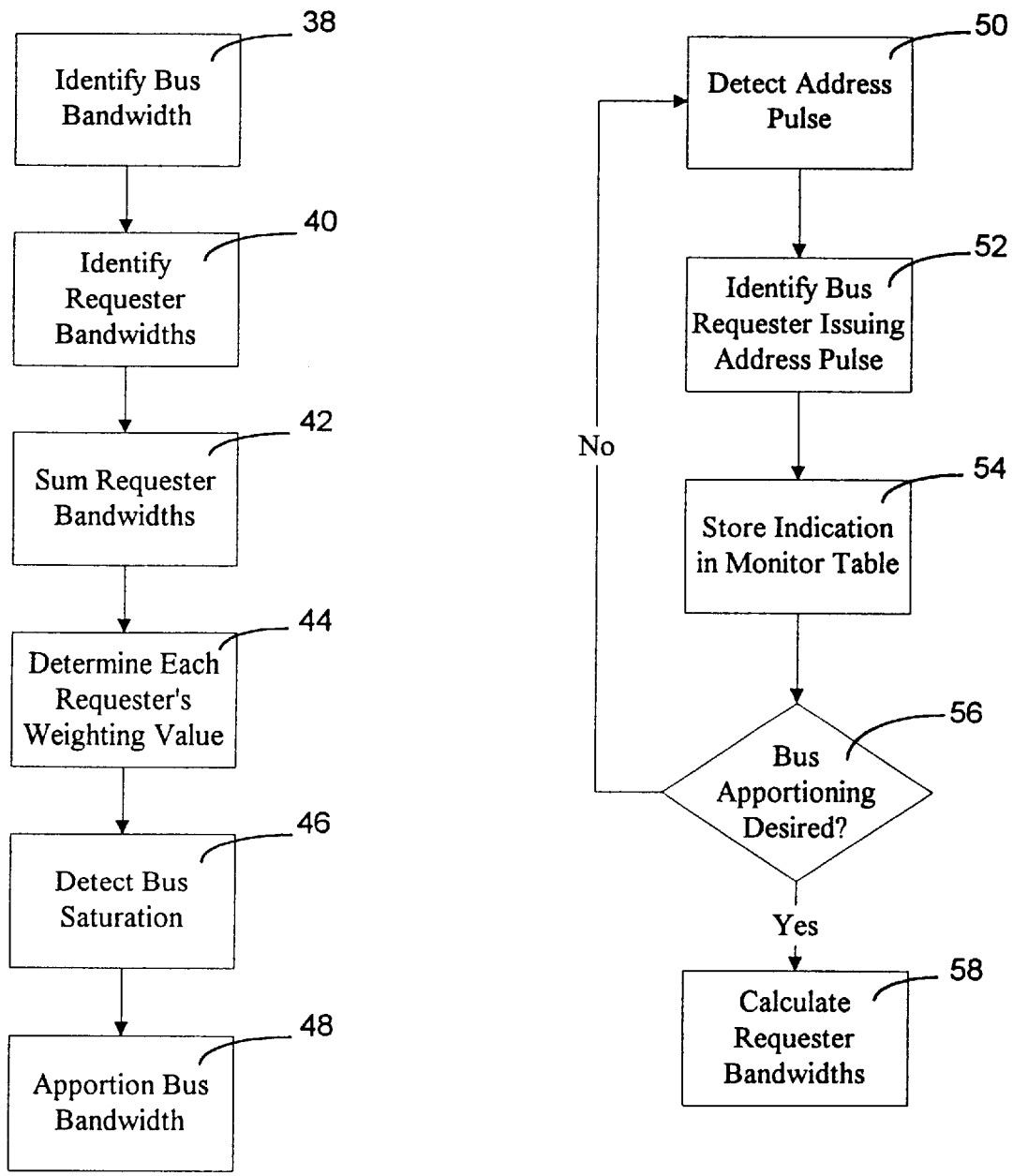
FIG. 2 is a flow diagram of a method of apportioning computer bus bandwidth according to the present invention.
FIG. 3 is a flow diagram of a method for identifying requester bandwidths for use in the method shown in FIG. 2.

A flow diagram of a first embodiment of the present invention is shown in FIG. 2. In step 38, the bandwidth of the processor bus 12 is identified. Typically, the bus bandwidth is identified by the BIOS 22 while the computer system 12 initializes itself or "boots up" after it is turned on. The bus bandwidth depends on the number of lines or electrical connectors that constitute the processor bus 12 as well as the clock speed of the processor bus 12.

In step 40, the requester bandwidths of the bus requesters 26–32 are identified. In the first embodiment, the requester bandwidths are identified by the BIOS 22 while the computer system 10 is booting up. The BIOS 22 queries each of the bus requesters 26–32 for an indication of the bus requesting type. The BIOS stores a lookup table that includes the rated maximum bandwidths of various types of bus requesters. Thus, the BIOS retrieves the appropriate bandwidth for each of the bus requesters. Alternatively, the rated maximum bandwidth of each bus requester 26–32 can be identified by setting appropriate hardware, such as jumpers, in the bus controller 24 when each of the bus requesters is connected to the bus controller. In step 42, the requester bandwidths of the bus requesters 26–32 are summed to obtain a total requester bandwidth.

In step 44, each bus requester's weighting value is determined. As discussed above, the weighting value for each of the bus requesters 26–32 preferably is determined by calculating the ratio of the bus requester's requester bandwidth to the total requester bandwidth. Thus, the weighting values based on the exemplary requester bandwidths discussed above are $\frac{1}{5}$ ($\frac{100}{500}$) for each of the main memory 26, hard drive A 28, and hard drive B 30 and $\frac{2}{5}$ ($\frac{200}{500}$) for the PCI bus 32.

In the first embodiment, each of steps 38–44 is performed by the BIOS 22 during the initialization process of the computer system 10. Thus, the BIOS 22 transmits the computed weighting values to the bus controller 24 which uses the weighting values to apportion the bandwidth of the processor bus 12. Alternatively, any of steps 38–44 can be directly performed by the bus controller 24.

At some point during the use of the computer system 10, the bus controller 24 detects that the processor bus 12 has become saturated in step 46. In response to the detection of bus saturation in step 46, the bus controller apportions the bandwidth of the processor bus 12 based on the weighting values determined in step 44 (step 48). Given the weighting values computed using the exemplary requester and bus bandwidths discussed above, the bus controller 24 apportions the 400 MB/s bandwidth of the processor bus 12 by assigning 80 MB/s ($\frac{1}{5}$ weighting value ×400 MB/s) to each of the main memory 26, hard drive A 28, and hard drive B 30 and 160 MB/s ($\frac{2}{5}$ weighting value ×400 MB/s) to the PCI bus 32.

The bus controller 24 can implement the apportioning step 48 in either of two ways. First, the bus controller could assign more equally-sized time periods or bandwidth windows to the bus requesters with higher weighting values. Returning to the exemplary values, the bus controller 24 assigns two bandwidth windows to the PCI bus 32 each time that one bandwidth window is assigned to each of the main memory 26, hard drive A 28 and hard drive B 30. Second, the bus controller 24 could assign the same number of bandwidth windows to each bus requester and increase the size of the bandwidth windows for the bus requesters with higher weighting values. Thus, the bus controller 24 can double the size of the bandwidth window assigned to the PCI bus 32 compared to the bandwidth windows assigned to the main memory 26, hard drive A 28 and hard drive B 30 in order to give the PCI bus $\frac{2}{5}$ of the bus bandwidth and $\frac{1}{5}$ of the bus bandwidth for each of the main memory, hard drive A, and hard drive B.

In the embodiment depicted in FIG. 2, the bus bandwidth is apportioned in step 48 in response to the detection of bus saturation in step 46. Alternatively, the bus bandwidth can be apportioned to the present invention regardless of whether the bus is saturated. In such an embodiment, the bus controller 24 allocates the bus bandwidth based on the weighting values regardless of whether the bus ever becomes saturated. Allocating the bus bandwidth based on the weighting values when the bus is not saturated enables the high bandwidth bus requesters to access the bus more often or for longer time periods than is permitted under prior art systems regardless of whether the bus saturates. Moreover, leaving the bus controller 24 in a mode that always apportions the bus bandwidth based on the weighting values eliminates the step of checking the bus to determine if it has saturated. Thus, in such an embodiment, the bus bandwidth is automatically apportioned based on the weighting values without needing to establish any test for detecting bus saturation.

Numerous methods can be employed to determine when the processor bus 12 has become saturated in step 46. The bus controller 26 could determine that the bus is saturated whenever each of the bus requesters 28–32 has a bus request ready at a predetermined consecutive number of times when it is the bus requester's turn for use of the processor bus 12. For example, the bus controller 24 could determine that the bus is saturated if a bus request is ready from each of the four bus requesters 26–32 two consecutive times through the sequential rotation of the bus requesters.

An alternate embodiment for identifying the requester bandwidths in step 40 of FIG. 2 is shown in FIG. 3. In the alternate embodiment, the requester bandwidths are determined dynamically based on how often each bus requester 26–32 uses the processor bus 12 during a predetermined period. The bus controller 24 monitors the usage of the processor bus 12 by detecting an address strobe on an address bus of the processor bus 12 in step 50. In step 52, the bus controller 24 identifies which of the bus requesters 26–32 issued the address strobe detected in step 50. In the Intel P6 computer system, each bus requester is assigned a two-bit identification code from zero to three. The address strobe transmitted by a bus requester includes the identification code of the bus requester. Thus, the bus controller 24 identifies which bus requester transmitted an address strobe simply by comparing the identification code in the address strobe with a stored table that matches bus requesters and their identification codes.

In step 54, the bus controller 24 stores in a monitor table an indication of which bus requester issued the address strobe. In step 56, the bus controller 24 determines whether it is desired to apportion the bus bandwidth of the processor bus 12. Preferably, the bus controller 24 determines that apportioning is desired whenever the processor bus 12 becomes saturated. Alternatively, if the bandwidth of the processor bus 12 is being apportioned according to the weighting values at all times regardless of bus saturation, then the bus controller may determine that bus apportioning is desired at predetermined time intervals.

When the bus controller determines that bus apportioning is desired in step 56, then the bus controller calculates the requester bandwidths in step 58. The bus controller 24 calculates the requester bandwidths in step 58 based on how often each bus requester has used the processor bus 12 as indicated in the stored monitor table. Typically, a bus requester can transmit a predetermined amount of data each time it transmits an address strobe, so the number of times the bus requester transmits an address strobe directly reflects the bandwidth of the bus requester as measured in megabytes per second (MBps). For example, if the monitor table indicates that the bus requesters 26–32 use the processor bus 200 times, 50 times, 50 times and 300 times, respectively, the bus controller 24 would determine that the main memory 26 has a relative bandwidth of $1/3$ ($200/600$), each of the hard drives 28, 30 have relative bandwidths of $1/12$ ($30/600$), and the PCI bus 32 has a relative bandwidth of $1/2$ ($300/600$). Thus, the bus controller 24 would assign $1/3$, $1/12$, $1/2$ and $1/2$ portions of the bus bandwidth to the main memory 26, hard drive A 28, hard drive B 30, and PCI bus 32, respectively.

Figure 4:
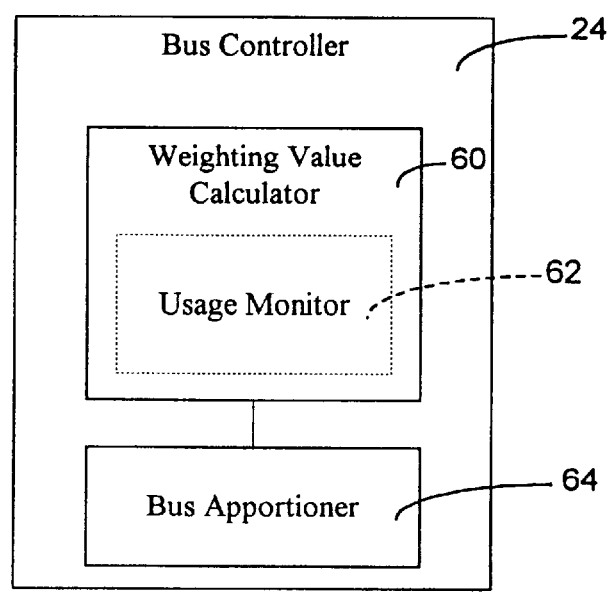
FIG. 4 is a block diagram of the system controller shown in FIG. 1.

Shown in FIG. 4 is a block diagram of the bus controller 24. The bus controller 24 includes a weighting value calculator that calculates the weighting values of the bus requesters 26–32 based on their requester bandwidths. The weighting value calculator 60 optionally includes a usage monitor 62 that monitors the use of the processor bus 12 in order to identify the requester bandwidths of the bus requesters 26–32. The weighting value calculator uses the identified requester bandwidths to calculate the weighting values of the bus requesters 26–32. Alternatively, the weighting value calculator 60 can calculate the weighting values of the bus requesters 26–32 based on static maximum requester bandwidths as determined by the BIOS 22 or the bus controller 24. The weighting value calculator 60 passes the weighting values of the bus requesters 26–32 to a bus apportioner 64 which apportions the bandwidth of the processor bus 12 according to the weighting values received from the weighting value calculator. It would be appreciated that the weighting value calculator 60 and the bus apportioner 64 can be software routines processed by a computer processor in the bus controller 24 or they can be discrete hardware elements.

Based on the foregoing discussion, it will be appreciated that the invention provides an arbitration mechanism that allocates the bandwidth of a computer bus more efficiently than prior art arbitration mechanisms. The invention apportions the bus bandwidth in a manner that ensures that each bus requester will be slowed equally on a percentage basis when the bus saturates. In contrast to prior art arbitration mechanisms, the present invention enables higher bandwidth bus requesters to continue to operate at a relatively high bandwidth when the bus is saturated. Thus, the present invention enables the higher bandwidth bus requesters to operate substantially as designed, that is, at a faster speed than the lower bandwidth bus requesters.

It should be understood that even though numerous advantages of the present invention have been set forth in the foregoing description, the above disclosure is illustrative only. Changes may be made in detail and yet remain within the broad principles of the present invention.

I claim:

1. In a computer system, a method of interfacing a plurality of bus requesters with a bus having a bus bandwidth, the method comprising:

identifying a requester bandwidth for each of the plurality of bus requesters;

summing the requester bandwidths to obtain a total bandwidth for the plurality of bus requesters;

determining, for each of the plurality of bus requesters, a weighting value representative of the ratio of the bus requester's requester bandwidth to the total bandwidth; and apportioning the bus bandwidth among the plurality of bus requesters by assigning to each of the plurality of bus requesters a portion of the bus bandwidth based on the bus requester's weighting value.

2. The method of claim 1, further comprising:

detecting that the bus has become saturated, wherein the apportioning step is performed in response to detecting that the bus has become saturated.

3. The method of claim 1 wherein the step of identifying the requester bandwidth includes, for each bus requester, querying the bus requester for a rated maximum bandwidth of the bus requester such that the rated maximum bandwidth is the requester bandwidth of the bus requester.

4. The method of claim 3 wherein the querying, summing, and determining steps are performed by a basic input/output system (BIOS) of the computer system, the BIOS passing each of the weighting values to a bus controller that uses the weighting values to apportion the bus bandwidth.

5. The method of claim 1 wherein the step of identifying the requester bandwidth includes, for each bus requester, monitoring how much the requester uses the bus and determining a dynamic requester bandwidth based on how much the requester uses the bus such that the dynamic requester bandwidth is the requester bandwidth.

6. The method of claim 5 wherein the step of monitoring how much the requester uses the bus includes monitoring how many times the requester transmits an address signal across an address line of the bus.

7. The method of claim 1 wherein the apportioning step includes assigning each bus requester a weighted requester bandwidth based on the weighting value and requester bandwidth of the bus requester.

8. In a computer system, a method of interfacing a plurality of bus requesters with a bus having a bus bandwidth, each bus requester having a requester bandwidth, the method comprising:
   determining, for each of the plurality of bus requesters, a weighting value based on the bus requester's requester bandwidth, wherein the determining step includes:
      identifying the requester bandwidth for each of the plurality of bus requesters;
      summing the requester bandwidths to obtain a total bandwidth for the plurality of bus requesters; and
      determining, for each of the plurality of bus requesters, a ratio of the bus requester's requester bandwidth to the total bandwidth such that the ratio reflects the weighting value for the bus requester; and
   apportioning the bus bandwidth among the plurality of bus requesters by assigning to each of the plurality of requesters a portion of the bus bandwidth based on the bus requester's weighting value.

9. The method of claim 8 wherein the step of identifying the requester bandwidth includes, for each requester, querying the requester for a rated maximum bandwidth of the requester such that the rated maximum bandwidth is the requester bandwidth.

10. The method of claim 9 wherein the querying, summing, and determining steps are performed by a basic input/output system (BIOS) of the computer system, the BIOS passing each of the weighting values to a bus controller that uses the weighting values to apportion the bus bandwidth.

11. The method of claim 8 wherein the step of identifying the requester bandwidth includes, for each requester, monitoring how much the requester uses the bus and determining a dynamic requester bandwidth based on how much the requester uses the bus such that the dynamic requester bandwidth is the requester bandwidth.

12. The method of claim 11 wherein the step of monitoring how much the requester uses the bus includes monitoring how many times the requester transmits an address signal across an address line of the bus.

13. The method of claim 8, further comprising:
   detecting that the bus has become saturated, wherein the apportioning step is performed in response to detecting that the bus has become saturated.

14. The method of claim 8 wherein the apportioning step includes assigning each bus requester a weighted requester bandwidth based on the weighting value and requester bandwidth of the bus requester.

15. A computer system for interfacing a plurality of bus requesters with a bus having a bus bandwidth, each bus requester having a requester bandwidth, the system comprising:
   a weighting value calculator that determines, for each of the plurality of bus requesters, a weighting value based on the bus requester's requester bandwidth, wherein the weighting value calculator includes a basic input/output system (BIOS) that is executed by a computer processor of the computer system, the BIOS identifying the requester bandwidth of each bus requester by querying each bus requester for a rated maximum bandwidth of the bus requester; and
   a bus controller in communication with the weighting value calculator, the bus controller apportioning the bus bandwidth among the plurality of bus requesters by assigning to each of the plurality of requesters a portion of the bus bandwidth based on the bus requester's weighting value.

16. A computer system for interfacing a plurality of bus requesters with a bus having a bus bandwidth, each bus requester having a requester bandwidth, the system comprising:
   a weighting value calculator that determines, for each of the plurality of bus requesters, a weighting value based on the bus requester's requester bandwidth, wherein the weighting value calculator is a software program executed by the bus controller; and
   a bus controller in communication with the weighting value calculator, the bus controller apportioning the bus bandwidth among the plurality of bus requesters by assigning to each of the plurality of requesters a portion of the bus bandwidth based on the bus requester's weighting value.

17. A computer system for interfacing a plurality of bus requesters with a bus having a bus bandwidth, each bus requester having a requester bandwidth, the system comprising:
   a weighting value calculator that determines, for each of the plurality of bus requesters, a weighting value based on the bus requester's requester bandwidth, wherein the weighting value calculator includes a usage monitor that monitors how much each bus requester uses the bus wherein the weighting value calculator identifies the requester bandwidth of each bus requester based on the bus usage monitored by the usage monitor; and
   a bus controller in communication with the weighting value calculator, the bus controller apportioning the bus bandwidth among the plurality of bus requesters by assigning to each of the plurality of requesters a portion of the bus bandwidth based on the bus requester's weighting value.

18. A computer system for interfacing a plurality of bus requesters with a bus having a bus bandwidth, each bus requester having a requester bandwidth, the system comprising:
   a weighting value calculator that determines, for each of the plurality of bus requesters, a weighting value based on the bus requester's requester bandwidth; and
   a bus controller in communication with the weighting value calculator, the bus controller apportioning the bus bandwidth among the plurality of bus requesters by assigning to each of the plurality of requesters a portion of the bus bandwidth based on the bus requester's weighting value, wherein the bus controller includes a saturation detector that detects when the bus has become saturated and the bus controller apportions the bus bandwidth in response to the detection that the bus has become saturated.

19. In a computer system, a method of interfacing a plurality of bus requesters with a bus having a bus bandwidth, the method comprising:
   identifying a requester bandwidth for each of the plurality of bus requesters;
   apportioning the bus bandwidth among the plurality of bus requesters by reducing the requester bandwidth of each bus requester by a weighting percentage that is substantially identical for each bus requester.

20. The method of claim 19, further comprising:

summing the identified requester bandwidths to obtain a total bandwidth for the plurality of bus requesters; and determining, for each of the plurality of bus requesters, a ratio of the identified requester bandwidth for the bus requester to the total bandwidth, wherein the apportioning step includes assigning each of the plurality of bus requesters a portion of the bus bandwidth that reflects the determined ratio for the bus requester.

21. The method of claim 19 wherein the step of identifying the requester bandwidth includes, for each requester, querying the requester for a rated maximum bandwidth of the requester such that the rated maximum bandwidth is the requester bandwidth.

22. The method of claim 19 wherein the step of identifying the requester bandwidth includes, for each requester, monitoring how much the requester uses the bus and determining a dynamic requester bandwidth based on how much the requester uses the bus such that the dynamic requester bandwidth is the requester bandwidth.

23. The method of claim 19, further comprising:

detecting that the bus has become saturated and wherein the apportioning step is performed in response to detecting that the bus has become saturated.

* * * * *